(12) United States Patent
Martin et al.

(10) Patent No.: US 11,688,219 B2
(45) Date of Patent: Jun. 27, 2023

(54) SYSTEMS AND METHODS FOR ACCESS CONTROL USING MULTI-FACTOR VALIDATION

(71) Applicant: Johnson Controls Tyco IP Holdings LLP, Milwaukee, WI (US)

(72) Inventors: Walter A. Martin, Ballymena (GB); Terence Neill, Lisburn (GB)

(73) Assignee: JOHNSON CONTROLS TYCO IP HOLDINGS LLP, Milwaukee, WI (US)

( * ) Notice: Subject to any disclaimer, the term of this patent is extended or adjusted under 35 U.S.C. 154(b) by 0 days.

(21) Appl. No.: 17/230,847

(22) Filed: Apr. 14, 2021

(65) Prior Publication Data

US 2021/0327186 A1 Oct. 21, 2021

Related U.S. Application Data

(60) Provisional application No. 63/011,822, filed on Apr. 17, 2020.

(51) Int. Cl.
*G07C 9/22* (2020.01)
*G07C 9/00* (2020.01)

(52) U.S. Cl.
CPC ........... *G07C 9/22* (2020.01); *G07C 9/00309* (2013.01); *G07C 2009/00769* (2013.01)

(58) Field of Classification Search
None
See application file for complete search history.

(56) References Cited

U.S. PATENT DOCUMENTS

| | | | |
|---|---|---|---|
| 8,180,641 B2* | 5/2012 | Levit | G10L 15/32 704/E15.021 |
| 9,762,581 B1 | 9/2017 | Wang et al. | |
| 9,801,066 B1* | 10/2017 | Hanley | G06Q 20/1085 |
| 9,858,739 B1* | 1/2018 | Johnson | G07C 9/00309 |
| 2010/0082343 A1* | 4/2010 | Levit | G10L 15/32 704/257 |
| 2018/0137857 A1* | 5/2018 | Zhou | G10L 15/02 |
| 2019/0147151 A1 | 5/2019 | Scopis et al. | |
| 2019/0392659 A1 | 12/2019 | Seenivasagam et al. | |
| 2021/0043018 A1* | 2/2021 | Zhang | G07C 9/00571 |
| 2021/0287469 A1* | 9/2021 | Ryhorchuk | G06K 9/00275 |

OTHER PUBLICATIONS

Extended European Search Report issued in corresponding European Application No. 21168840.3 dated Sep. 10, 2021.

* cited by examiner

*Primary Examiner* — Carlos Garcia
(74) *Attorney, Agent, or Firm* — ArentFox Schiff LLP (57) ABSTRACT

Aspects of the present disclosure provide systems and methods for access control using multi-factor validation. In an example, an access control system is designed to be used in conjunction with a first recognition system, such as facial recognition system, a gait recognition system, or audio recognition system, that uses a confidence level to determine whether individuals are authorized to access a restricted area. When the first recognition system is unable to confidently identify the individual, a second recognition system, such as a mobile device system or access card system, may be used to provide second factor verification. Further, stored recognition data may be updated to include information gathered by the first recognition system in response to use of the second factor verification.

20 Claims, 4 Drawing Sheets

SYSTEMS AND METHODS FOR ACCESS CONTROL USING MULTI-FACTOR VALIDATION

CROSS-REFERENCE TO RELATED APPLICATION(S)

This application claims the benefit of U.S. Provisional Application Ser. No. 63/011,822, entitled "SYSTEMS AND METHODS FOR ACCESS CONTROL USING MULTI-FACTOR VALIDATION" and filed on Apr. 17, 2020, which is expressly incorporated by reference herein in its entirety.

TECHNICAL FIELD

The present disclosure generally relates to systems and methods for access control, in particular systems and methods for access control using multi-factor validation.

BACKGROUND

Access control systems are often used at public and private premises, such as households, commercial buildings, businesses, retail establishments, schools, hospitals and government buildings, to list a few examples. Nodes for the access control systems may be installed at access points of the premises (e.g. front and interior doors of a building) to control access to restricted areas, such as the building itself or to areas within the buildings. The access control systems may authenticate (or authorizes) individuals using authentication systems based on confidence levels in recognizing whether the individuals are authorized to access restricted areas. Some authentication systems, such as facial recognition, audio recognition, or gait recognition, have a low confidence level because these authentication systems have a difficult time recognizing the individuals.

In view of the foregoing, there is a need to more efficiently and more securely control access to restricted areas.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. The sole purpose of this summary is to present some concepts of one or more implementations of the present disclosure in a simplified form as a prelude to the more detailed description that is presented later.

In an aspects, a method for access control to restricted area is provided. The method may include determining a confidence level associated with first recognition information from a first recognition system is below a threshold, wherein the first recognition information corresponds to information on an identity of an individual attempting to access the restricted area. The method may also include receiving second recognition information from a second recognition system, different from the first recognition system, in response to determining the confidence level. The method may also include comparing the second recognition information to stored recognition data. The method may also include transmitting a signal to an access gate to provide access for the individual to the restricted area in response to the second recognition information matching the stored recognition data. denying the access for the individual to the restricted area in response to the second recognition information not matching the stored recognition data.

In other implementations, the present disclosure may include systems and devices to perform one or more of the actions described herein, and computer-readable medium storing instructions executable by a processor to perform one or more of the actions described herein.

Additional advantages and novel features relating to implementations of the present disclosure will be set forth in part in the description that follows, and in part will become more apparent to those skilled in the art upon examination of the following or upon learning by practice thereof.

DESCRIPTION OF THE FIGURES

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures may be shown in exaggerated or generalized form in the interest of clarity and conciseness. The disclosure itself, however, as well as a preferred mode of use, further objects and advances thereof, will be best understood by reference to the following detailed description of illustrative aspects of the disclosure when read in conjunction with the accompanying drawings, wherein:

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components may be shown in block diagram form in order to avoid obscuring such concepts.

Aspects of the present disclosure provide systems and methods for access control using multi-factor validation. In an example, an access control system is designed to be used in conjunction with a first recognition system, such as facial recognition system, a gait recognition system, or audio recognition system, that uses a confidence level to determine whether individuals are authorized to access a restricted area. When the first recognition system is unable to confidently identify the individual, e.g., when a confidence level is below a confidence level threshold, a second recognition system, such as a mobile device system or access card system, may be used to provide second factor verification.

The systems and methods described herein may be used to update a database of the first recognition system by providing updated authentication information (e.g., updated facial images) of the individual and also may be used as a safety measure to combat attempts to defeat the first authentication system.

Turning now to the figures, example aspects are depicted with reference to one or more components described herein, where components in dashed lines may be optional.

Figure 1:
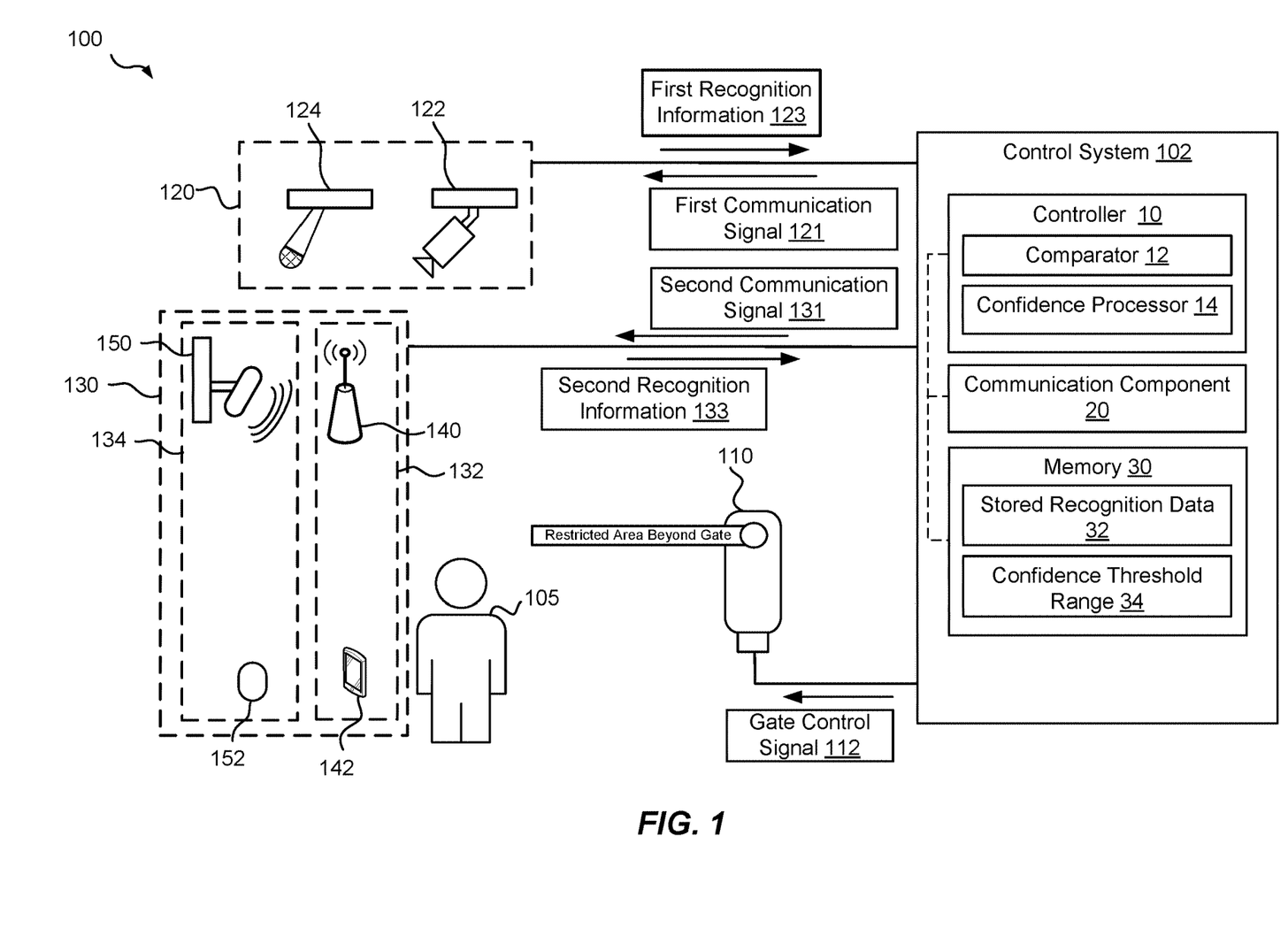
FIG. 1 illustrates a schematic view of an example operating environment of an access control system, in accordance with aspects of the present disclosure.

Referring to FIG. 1, an example access control system 100 is depicted. In an aspect, the access control system 100 may include a control system 102 configured to control an access gate 110. The access gate 110 is configured to provide (or deny) entrance of an individual 105 into a restricted area such as a room, a building, or any other area which requires access control. The access gate 110 may include a mechanical arm gate, a door, a touchless access gate, or any other access control mechanism for providing access of the individual 105 into the restricted area. In an example, the access gate 110 may receive an access control signal 112 from the control system 102 configured to instruct the access gate 110 to provide (or deny) access to the restricted area.

The access control system 100 may also include a first recognition system 120 for monitoring the individual 105 when attempting to access the restricted area. In an example, the control system 102 may transmit a first communication signal 121 to the first recognition system 120 to activate the first recognition system 120 and/or request for first recognition information 123 from the first recognition system 120. The first recognition system 120 may include one or more biometric technologies including, but not limited to, a facial recognition technology, an audio recognition technology, a gait recognition technology, or any other biometric technology having a low guarantee (e.g., less than 100%) of identifying the individual. In an example, the first recognition system 120 may use one or more of a camera 122 and/or a microphone 124 to generate the first recognition information 123, such as image data or audio data of the individual 105, which provides information for verifying an identity of the individual 105. In an example, the first recognition system 120 sends the first recognition information 123 to the control system 102.

The access control system 100 may also include a second recognition system 130 for providing multi-factor authentication of the individual 105 attempting to access the restricted area. In an example, the control system 102 may transmit a second communication signal 131 to the second recognition system 130 to activate the second recognition system 130 and/or request for second recognition information 133 from the second recognition system 130. Examples of the second recognition system 130 may include, but are not limited to, one or more of a mobile device verification system 132, a card reader system 134, or any other recognition technology resulting in a high guarantee (e.g. 100%) of identifying individuals attempting to access the restricted area. In an example, the second recognition system 130 may generate second recognition information 133 including identifying information of an authorized personnel. In an example, the second recognition system 130 sends the second recognition information 133 to the control system 102.

In an aspect, the mobile device verification system 132 may include a wireless communication device 140, such as an access point, configured to wirelessly communicate with the mobile device 142. In an example, the mobile device 142 may be a device previously registered to the access control system 100 by an authorized personnel. The mobile device 142 may include an application configured to receive a notification (e.g., text notification or push notification) containing instructions for the authorized personnel to confirm or deny an attempt to enter the restricted area. In response to the notification, the mobile device 142 may generate the second recognition information 133 which confirms (or denies) the attempt to enter the restricted area. In an example, the notification may request the individual 105 provide a special response (e.g., password), a finger print confirmation, or any other form of confirmation (or denial) of the authorized personnel. In another example, the mobile device 142 may link with the wireless communication device 140 through a local area network (LAN) technology, such as WiFi, which may provide confirmation that the mobile device 142 is within a proximity (e.g., building) of the access gate 110. In the mobile device verification system 132, the second recognition information 133 may include, for example, one or more of an acknowledgment, the special response, finger print data, or proximity information.

In another aspect, the card reader system 134 may include a card reader 150 configured to communicate with access card 152. In an example, the card reader 150 may transmit, through radio frequency, a second signal to determine a presence of the access card 152 at or near the access gate 110. In the card reader system 134, the second recognition information 133 may include information to confirm or deny the presence of the access card 152.

In an aspect, the control system 102 includes a controller 10 configured to control aspects of the control system 102, the access gate 110, the first recognition system 120, and the second recognition system 130. The controller 10 may be communicatively coupled with a communication component 20 and a memory 30 of the control system 102.

The controller is configured to communicate with the access gate 110, the first recognition system 120, and the second recognition system 130 via the communication component 20. For example, the controller 10 controls the communication component 20 to transmit the access control signal 112 to the access gate 110 to provide or deny access to the restricted area. In another example, the controller 10 controls the communication component 20 to transmit the first communication signal 121 to the first recognition system 120 and/or the second communication signal 131 to the second recognition system 130 to enable/disable the devices corresponding to these systems. In an example, the controller 10 receives via the communication component 20 the first recognition information 123 and the second recognition information 133.

In an aspect, the controller 10 may include a comparator 12 configured to compare the first recognition information 123 or the second recognition information 133 with stored recognition data 32 stored in the memory 30. In an example, the stored recognition data 32 includes data associated with authorized personnel including one or more of facial images for facial recognition, gait images for gait recognition, audio samples for audio recognition, passwords, identifications or phone numbers of mobile devices (including mobile device 142), card identification number of access cards (including access card 152), or any other data for the recognition of the authorized personnel. In an example, the comparator 12 may determine, based on comparing the data, whether the first recognition information 123 or the second recognition information 133 matches with the stored recognition data 32.

In an aspect, the controller 10 may also include a confidence processor 14 configured to determine a confidence level (e.g., percentage value) of the match between the first recognition information 123 and the stored recognition data 32. In an example, when the comparator 12 determines a match between the first recognition information 123 and the stored recognition data 32, the confidence processor 14 may determine the confidence level of the match to indicate a confidence in the match (e.g., 80% confidence). When the confidence level is greater than a confidence threshold range 34 (e.g., 75%-95% confidence level), the controller 10 may provide access for the individual 105 to enter the restricted area by transmitting the access control signal 112 to the access gate 110. When the confidence level is less than the confidence threshold range 34, the controller 10 may deny access for the individual 105 to enter the restricted area.

When the confidence level is within the confidence threshold range 34, this may indicate to the controller 10 there are one or more potential authorized personnel that may match with the individual 105. The controller 10 may then transmit the second communication signal 131 to enable the second recognition system 130 to authenticate the individual 105 based on stored recognition data 32 corresponding to the one or more potential authorized personnel. For example, the controller 10 may transmit one or more text notifications or push notifications to mobile devices associated with the one or more potential authorized personnel based on the confidence level being within the confidence threshold range 34.

In some examples, the controller 10 may wait for the second recognition information 133, which may include, for example, an acknowledgment such as a password or a fingerprint reader from the mobile device 142, proximity information of the mobile device 142, a card identification number from an access card 152. If acknowledgement is received from the second recognition system 130, the individual 105 is determined to be the authorized personnel and provided access to the restricted area. Otherwise, access is denied to the individual 105 to the restricted area.

In some examples, the control system 102 may perform the multi-factor authentication operations using both the first recognition system 120 and the second recognition system 130 through a randomized selection basis to update stored recognition data 32. For example, once the individual 105 is determined to be an authorized personnel via use of the second recognition system 130, the controller 10 may update the stored recognition data 32 including, for example, facial images, gait images, or voice samples of the individual 105 for use by the controller 10 in further access control operations.

Figure 2:
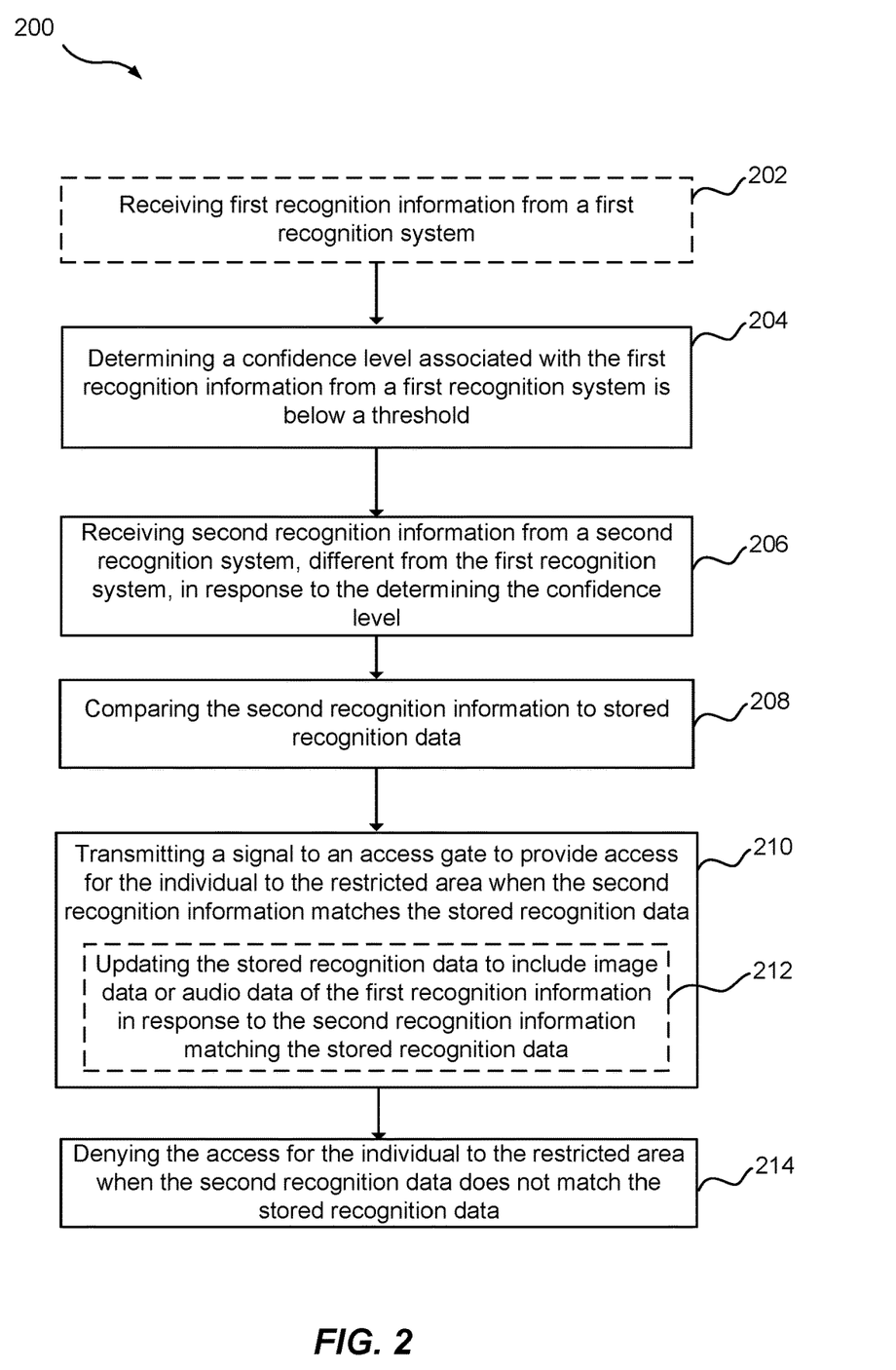
FIG. 2 is a flowchart of an example method of operation of the access control system of FIG. 1, in accordance with aspects of the present disclosure.

Referring to FIG. 2, an example method 200 of the operation of and interactions between various modules of the access control system 100 is disclosed. FIG. 1 may be referenced in combination with the flowchart of FIG. 2. In an example, the example method 200 is implemented by one or more of the control system 102, a computer system (e.g., computer system 300 of FIG. 3), a processor (e.g., processor 304 of FIG. 3), and/or one or more components/subcomponents.

At 202, the example method 200 optionally includes receiving first recognition information from a first recognition system. In an example, one or more of the control system 102, the computer system 300, the processor 304, and/or one or more components/subcomponents (e.g., controller 10, communication component 20, or communication interface 324 of FIG. 3) receive the first recognition information 123 from the first recognition system 120. The first recognition information 123 may correspond to information on an identity of the individual 105 attempting to access the restricted area. The first recognition information 123 may be received in response to a detection of the individual attempting to pass the access gate 110 to enter the restricted area. The first recognition information 123 may include, for example, image data or audio data of the individual 105 which can be used for facial recognition, gait recognition, or audio recognition. The first recognition information 123 may be captured by one or more of the camera 122 or the microphone 124 of the first recognition system 120.

At 204, the example method 200 also includes determining a confidence level associated with first recognition information is below a threshold. In an example, one or more of the control system 102, the computer system 300, the processor 304, and/or one or more components/subcomponents (e.g., controller 10, comparator 12, or confidence processor 14) determines a confidence level associated with the first recognition information 123 is below a threshold. In an example, the confidence level indicates a percentage value of a match between the first recognition information 123 and the stored recognition data 32. As described herein, the stored recognition data 32 may include one or more of image data or audio data associated with authorized personnel to access the restricted area. In an example, the first recognition information 123 is compared to the stored recognition data 32 and a confidence level is determined based on the comparison.

At 206, the example method 200 also includes receiving second recognition information from a second recognition system, different from the first recognition system, in response to determining the confidence level. In an example, one or more of the control system 102, the computer system 300, the processor 304, and/or one or more components/subcomponents (e.g., controller 10, communication component 20, or communication interface 324 of FIG. 3) receives the second recognition information 133 from the second recognition system 130, different from the first recognition system 120. The second recognition information 133 may correspond to identifying information that provides a higher guarantee (e.g., 100%) the individual 105 is an authorized personnel to enter the restricted area as compared to the first recognition information 123. In an example, the second recognition information 133 includes an acknowledgment, a special response such as a password, finger print data, proximity information of the mobile device 142 associated with an authorized personnel, or access card identification information of the access card 152 associated with the authorized personnel. In an example, the second recognition information 133 may be received in response to the confidence level of the first recognition information 123 being below a confidence level (e.g., below 95% confidence level of individual 105 is an authorized personnel) or within a confidence level range (e.g., 75-95% confidence level).

In an example, the example method 200 may also include determining a location of a mobile device associated with an authorized personal estimated to correspond to the identity of the individual, wherein the second recognition information includes the location of the mobile device and the stored recognition data includes a location of the restricted area. In an example, one or more of the control system 102, the computer system 300, the processor 304, and/or one or more components/subcomponents (e.g., controller 10, communication component 20, or communication interface 324 of FIG. 3) determines a location of the mobile device 142 associated with an authorized personal estimated to correspond to the identity of the individual 105. As described herein, the control system 102 (or another system or component) may estimate that one or more authorized personnel are estimated to correspond to the individual 105 based on a confidence level of the individual 105 being at a threshold or within a threshold range. Accordingly, the control system 102 (or another system or component) communicate with the mobile device 142 registered to the one or more authorized personnel. For example, the second communication signal 131 may ping the mobile device 142 to request a location of the mobile device 142 and/or the authorized personnel associated with the mobile device 142. Accordingly, in this example, the second recognition information 133 may include the response to the request for the location of the mobile device 142. Alternatively, the second recognition information 133 may include information indicating the mobile device 142 is connected to a LAN associated with an entrance of the restricted area. This may the individual 105 is the authorized personnel.

In an example, the example method 200 may also include transmitting a notification to a mobile device associated with an authorized personal estimated to correspond to the identity of the individual, wherein the second recognition information includes a response to the notification received from the mobile device. In an example, one or more of the control system 102, the computer system 300, the processor 304, and/or one or more components/subcomponents (e.g., controller 10, communication component 20, or communication interface 324 of FIG. 3) transmits a notification via the second communication signal 131 to the mobile device 142 associated with an authorized personal estimated to correspond to the identity of the individual 105. In this example, the second recognition information 133 includes a response to the notification received from the mobile device 142. As described herein, the control system 102 (or another system or component) may estimate that one or more authorized personnel are estimated to correspond to the individual 105 based on a confidence level of the individual 105 being at a threshold or within a threshold range.

In an example, the second recognition information further includes one or more of an acknowledgment or denial of the notification, a special response including a password, or a finger print confirmation.

In an example, the example method 200 may also include transmitting a second signal to determine a presence of an access card at or near an entrance to the restricted area, wherein the second recognition information includes a response to the second signal, and wherein the access card is associated with an authorized personal estimated to correspond to the identity of the individual. In an example, one or more of the control system 102, the computer system 300, the processor 304, and/or one or more components/subcomponents (e.g., controller 10, communication component 20, or communication interface 324 of FIG. 3) transmits a signal (e.g., the second communication signal 131) to determine a presence of an access card at or near an entrance to the restricted area. As described herein, the control system 102 (or another system or component) may estimate that one or more authorized personnel are estimated to correspond to the individual 105 based on a confidence level of the individual 105 being at a threshold or within a threshold range.

At 208, the example method 200 also includes comparing the second recognition information to stored recognition data. In an example, one or more of the control system 102, the computer system 300, the processor 304, and/or one or more components/subcomponents (e.g., controller 10, comparator 12, or confidence processor 14) compares the second recognition information 133 to the stored recognition data 32. As described herein, the stored recognition data 32 may include one or more of access card identification, finger print identification, password, and/or other data associated with authorized personnel to access the restricted area. In this example, comparison is performed to determine whether the second recognition information 133 matches the stored recognition data 32. As described herein, matching the second recognition information 133 to the stored recognition data 32 may indicate a higher confidence (e.g., 100%) that the individual 105 is an authorized personnel, as compared to matching the first recognition information 123 to the stored recognition data 32.

At 210, the example method 200 also includes transmitting a signal to an access gate to provide access for the individual to the restricted area in response to the second recognition information matching the stored recognition data. In an example, one or more of the control system 102, the computer system 300, the processor 304, and/or one or more components/subcomponents (e.g., controller 10, communication component 20, or communication interface 324 of FIG. 3) transmits the access control signal 112 to the access gate 110 to provide access for the individual 105 to the restricted area in response to the second recognition information 133 matching the stored recognition data 32.

At 212, the example method 200 optionally includes updating the stored recognition data to include image data or audio data of the first recognition information in response to the second recognition information matching the stored recognition data. In an example, one or more of the control system 102, the computer system 300, the processor 304, and/or one or more components/subcomponents (e.g., controller 10) captures image data or audio data (via first recognition information 123) updating the stored recognition data 32 to include image data or audio data of the first recognition information 123 in response to the second recognition information 133 matching the stored recognition data 32. In this example, the stored recognition data 32 may be updated for the control system 102 (and/or other systems and components) to have updated information of the authorized personnel based on recent access to the restricted area. In an example, the updating of the stored recognition data 32 may be performed on a random bases.

At 214, the example method 200 also includes denying the access for the individual to the restricted area in response to the second recognition information not matching the stored recognition data. In an example, one or more of the control system 102, the computer system 300, the processor 304, and/or one or more components/subcomponents (e.g., controller 10, communication component 20, or communication interface 324 of FIG. 3) denies access for the individual 105 to the restricted area in response to the second recognition information 133 not matching the stored recognition data 32 by not transmitting the access control signal 112 or, alternatively, may deny access by transmitting a denial signal via the access control signal 112 to close the access gate 110.

Figure 3:
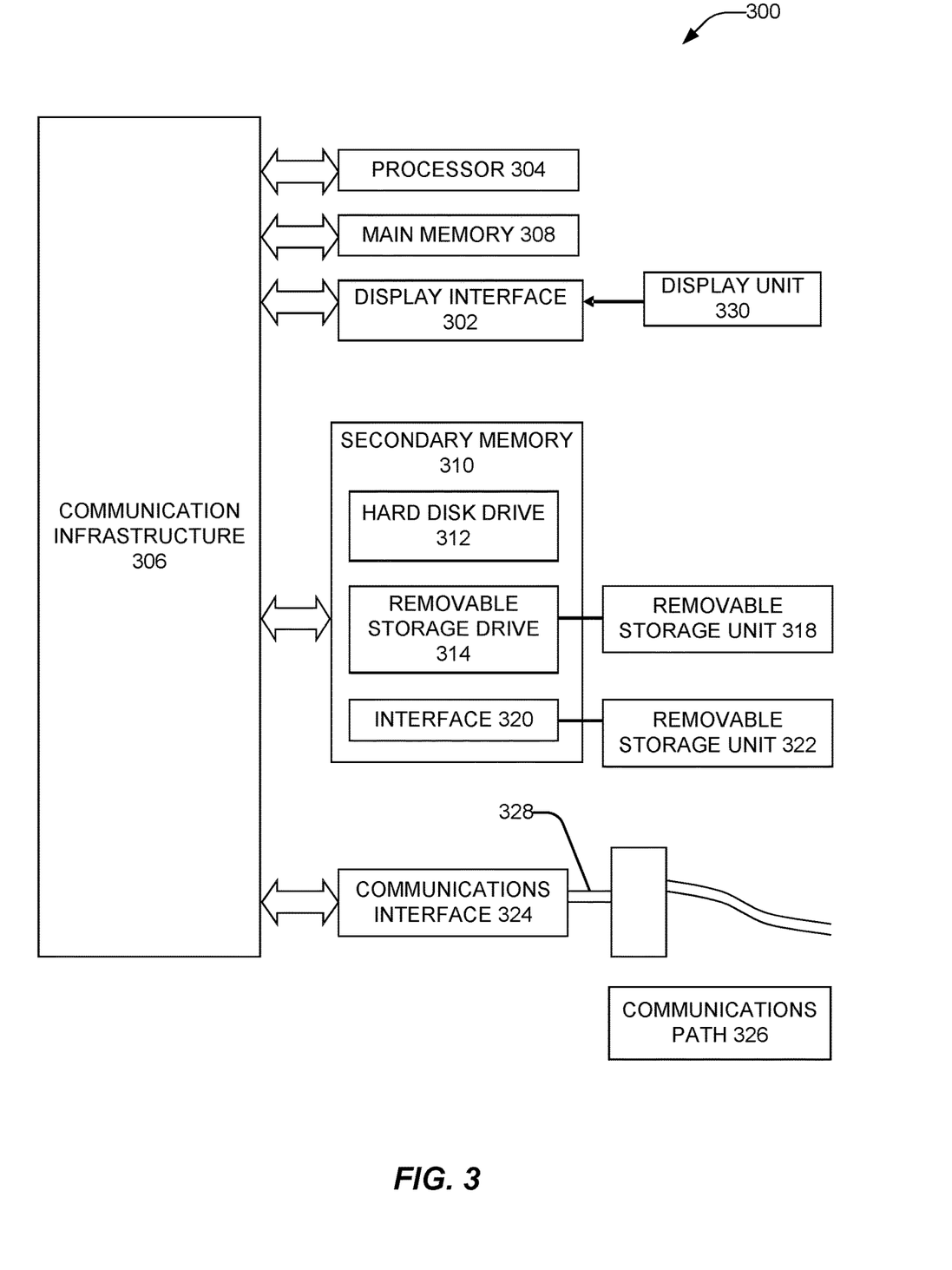
FIG. 3 is a block diagram of an example of various hardware components and other features of a computer system that operate the access control system of FIG. 1, in accordance with aspects of the present disclosure.

Aspects of the present disclosure may be implemented using hardware, software, or a combination thereof and may be implemented in one or more computer systems or other processing systems. In one aspect, the disclosure is directed toward one or more computer systems capable of carrying out the functionality described herein. FIG. 3 presents an example system diagram of various hardware components and other features that may be used in accordance with aspects of the present disclosure. Aspects of the present disclosure may be implemented using hardware, software, or a combination thereof and may be implemented in one or more computer systems or other processing systems. In one example variation, aspects of the disclosure are directed toward one or more computer systems capable of carrying out the functionality described herein. An example of such a computer system 300 is shown in FIG. 3. In an example, the computer system 300 may be an example of the control system 102, described herein.

The computer system 300 includes one or more processors, such as the processor 304. In an example, the processor 304 may be an example of the controller 10, described herein. The processor 304 is connected to the communication infrastructure 306 (e.g., a communications bus, crossover bar, or network). Various software aspects are described in terms of this example computer system. After reading this description, it will become apparent to a person skilled in the relevant art(s) how to implement aspects of the disclosure using other computer systems and/or architectures.

The processor 304, or any other "processor," as used herein, processes signals and performs general computing and arithmetic functions. Signals processed by the processor 304 may include digital signals, data signals, computer instructions, processor instructions, messages, a bit, a bit stream, or other computing that may be received, transmitted and/or detected.

The communication infrastructure 306 refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a bus that interconnects components inside a access control system using protocols, such as Controller Area network (CAN), Local Interconnect Network (LIN), Wiegand and Open Supervised Device Protocol (OSDP) among others.

Further, the connection between components of the computer system 300, or any other type of connection between computer-related components described herein may be referred to an operable connection, and may include a connection by which entities are operably connected, such that signals, physical communications, and/or logical communications may be sent and/or received. An operable connection may include a physical interface, a data interface and/or an electrical interface.

The computer system 300 may include a display interface 302 that forwards graphics, text, and other data from the communication infrastructure 306 (or from a frame buffer not shown) for display on a display unit 330. The computer system 300 also includes a main memory 308, preferably random access memory (RAM), and may also include a secondary memory 310. The secondary memory 310 may include, for example, a hard disk drive 312 and/or a removable storage drive 314, representing a floppy disk drive, a magnetic tape drive, an optical disk drive, etc. In an example, the main memory 308 may be an example of the memory 30, described herein. The removable storage drive 314 reads from and/or writes to a removable storage unit 318 in a well-known manner. The removable storage unit 318, represents a floppy disk, magnetic tape, optical disk, etc., which is read by and written to removable storage drive 314. As will be appreciated, the removable storage unit 318 includes a computer usable storage medium having stored therein computer software and/or data.

In alternative aspects, the secondary memory 310 may include other similar devices for allowing computer programs or other instructions to be loaded into the computer system 300. Such devices may include, for example, a removable storage unit 322 and an interface 320. Examples of such may include a program cartridge and cartridge interface (such as that found in video game devices), a removable memory chip (such as an erasable programmable read only memory (EPROM), or programmable read only memory (PROM)) and associated socket, and other removable storage units 322 and interfaces 320, which allow software and data to be transferred from the removable storage unit 322 to the computer system 300.

It should be understood that a memory, as used herein may include volatile memory and/or non-volatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and/or direct RAM bus RAM (DRRAM).

The computer system 300 may also include a communications interface 324. In an example, the communication interface 324 may be an example of the communication component 20, described herein. The communications interface 324 allows software and data to be transferred between computer system 300 and external devices. Examples of the communications interface 324 may include a modem, a network interface (such as an Ethernet card), a communications port, a Personal Computer Memory Card International Association (PCMCIA) slot and card, etc. Software and data transferred via the communications interface 324 are in the form of signals 328, which may be electronic, electromagnetic, optical or other signals capable of being received by communications interface 324. These signals 328 are provided to the communications interface 324 via a communications path (e.g., channel) 326. This path 326 carries signals 328 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 680, a hard disk installed in hard disk drive 670, and the signals 328. These computer program products provide software to the computer system 300. Aspects of the disclosure are directed to such computer program products.

Computer programs (also referred to as computer control logic) are stored in the main memory 608 and/or the secondary memory 310. Computer programs may also be received via the communications interface 324. Such computer programs, when executed, enable the computer system 300 to perform various features in accordance with aspects of the present disclosure, as discussed herein. In particular, the computer programs, when executed, enable the processor 304 to perform such features. Accordingly, such computer programs represent controllers of the computer system 300.

In variations where aspects of the disclosure are implemented using software, the software may be stored in a computer program product and loaded into the computer system 300 using the removable storage drive 314, the hard drive 312, or the communications interface 320. The control logic (software), when executed by the processor 304, causes the processor 304 to perform the functions in accordance with aspects of the disclosure as described herein. In another variation, aspects are implemented primarily in hardware using, for example, hardware components, such as application specific integrated circuits (ASICs). Implementation of the hardware state machine so as to perform the functions described herein will be apparent to persons skilled in the relevant art(s).

In yet another example variation, aspects of the disclosure are implemented using a combination of both hardware and software.

Figure 4:
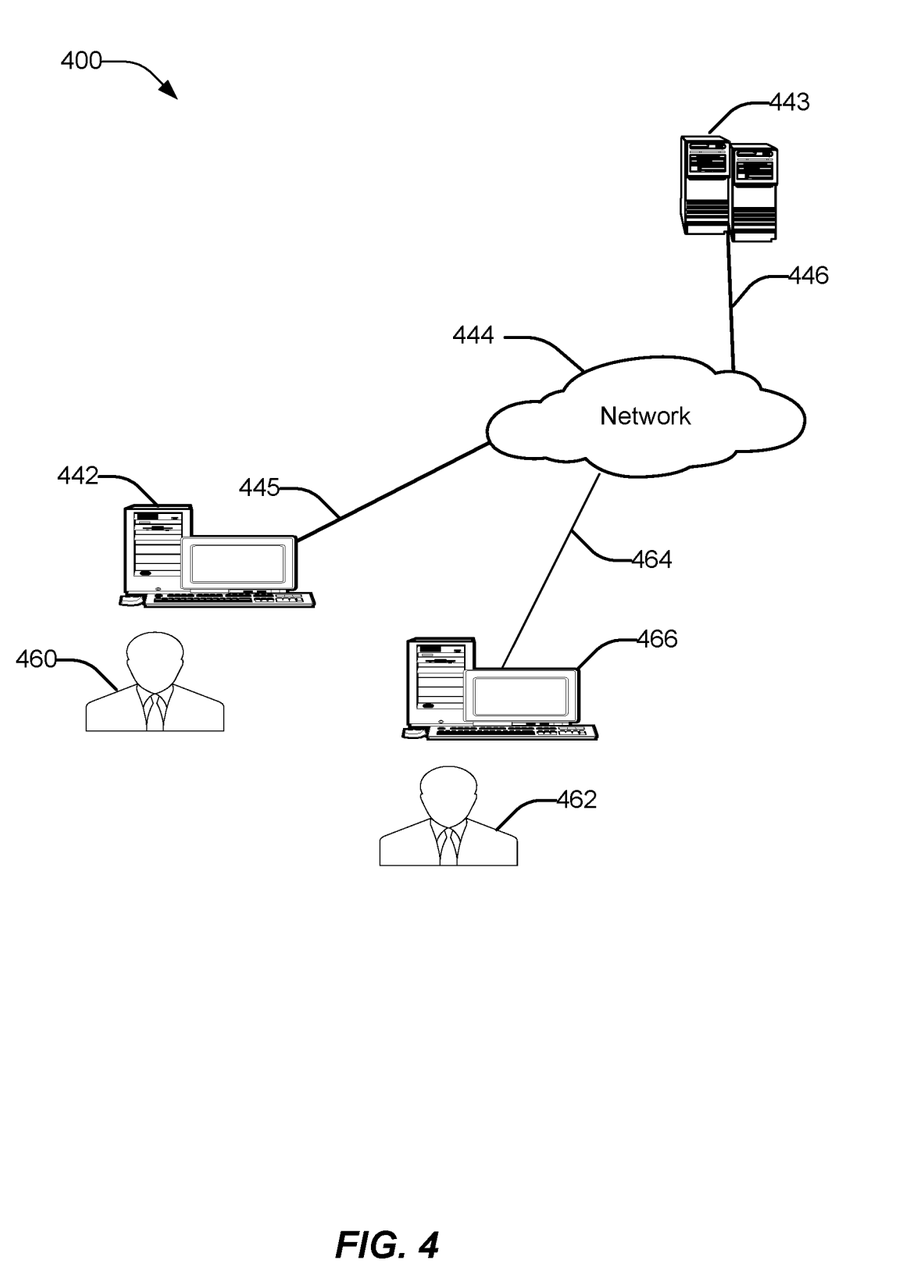
FIG. 4 is a block diagram of various example system components that implement the access control system of FIG. 1, for use in accordance with aspects of the present disclosure.

FIG. 4 is a block diagram of various example system components that may be used in accordance with aspects of the present disclosure. For example, the various components may be within the access control system 100, or only some of the components may be within the access control system 100, and other components may be remote from the access control system 100. The system 400 includes one or more accessors 460, 462 (also referred to interchangeably herein as one or more "users" or persons seeking to gain access to a location) and one or more terminals 442, 466 (such terminals may be or include, for example, various features of the control system 102). In one aspect, data for use in accordance with aspects of the present disclosure is, for example, input and/or accessed by accessors 460, 462 via terminals 442, 466, such as personal computers (PCs), minicomputers, mainframe computers, microcomputers, telephonic devices, or wireless devices, such as personal digital assistants ("PDAs") or a hand-held wireless devices coupled to a server 443, such as a PC, minicomputer, mainframe computer, microcomputer, or other device having a processor and a repository for data and/or connection to a repository for data, via, for example, a network 444, such as the Internet or an intranet, and couplings 445, 446, 464. The couplings 445, 446, 464 include, for example, wired, wireless, or fiber optic links. In another example variation, the method and system in accordance with aspects of the present disclosure operate in a stand-alone environment, such as on a single terminal.

Additional Embodiments

An example method for access control to restricted area, comprising: determining a confidence level associated with first recognition information from a first recognition system is below a threshold, wherein the first recognition information corresponds to information on an identity of an individual attempting to access the restricted area; receiving second recognition information from a second recognition system, different from the first recognition system, in response to determining the confidence level; comparing the second recognition information to stored recognition data; transmitting a signal to an access gate to provide access for the individual to the restricted area in response to the second recognition information matching the stored recognition data; and denying the access for the individual to the restricted area in response to the second recognition information not matching the stored recognition data.

The above example method, wherein the first recognition system includes one or more of a facial recognition system, a gait recognition system, or an audio recognition system.

One or more of the above example methods, wherein the second recognition system includes a mobile device verification system, and wherein the method further comprises: determining a location of a mobile device associated with an authorized personal estimated to correspond to the identity of the individual, wherein the second recognition information includes the location of the mobile device and the stored recognition data includes a location of the restricted area.

One or more of the above example methods, wherein the second recognition system includes a mobile device verification system, and wherein the method further comprises: transmitting a notification to a mobile device associated with an authorized personal estimated to correspond to the identity of the individual, wherein the second recognition information includes a response to the notification received from the mobile device.

One or more of the above example methods, wherein the second recognition information further includes one or more of an acknowledgment or denial of the notification, a special response including a password, or a finger print confirmation.

One or more of the above example methods, wherein the second recognition system includes a card reader system, and wherein the method further comprises: transmitting a second signal to determine a presence of an access card at or near an entrance to the restricted area, wherein the second recognition information includes a response to the second signal, and wherein the access card is associated with an authorized personal estimated to correspond to the identity of the individual.

One or more of the above example methods, further comprising: updating the stored recognition data to include image data or audio data of the first recognition information in response to the second recognition information matching the stored recognition data.

An example access control system for a restricted area, comprising: a memory storing instructions; and a processor coupled with the memory and configured to: determine a confidence level associated with first recognition information from a first recognition system is below a threshold, wherein the first recognition information corresponds to information on an identity of an individual attempting to access the restricted area; receive second recognition information from a second recognition system, different from the first recognition system, in response to determining the confidence level; compare the second recognition information to stored recognition data; transmit a signal to an access gate to provide access for the individual to the restricted area in response to the second recognition information matching the stored recognition data; and deny the access for the individual to the restricted area in response to the second recognition information not matching the stored recognition data.

The above example access control system, wherein the first recognition system includes one or more of a facial recognition system, a gait recognition system, or an audio recognition system.

One or more of the above example access control systems, wherein the second recognition system includes a mobile device verification system, and wherein the processor is further configured to: determine a location of a mobile device associated with an authorized personal estimated to correspond to the identity of the individual, wherein the second recognition information includes the location of the mobile device and the stored recognition data includes a location of the restricted area.

One or more of the above example access control systems, wherein the second recognition system includes a mobile device verification system, and wherein the processor is further configured to: transmit a notification to a mobile device associated with an authorized personal estimated to correspond to the identity of the individual, wherein the second recognition information includes a response to the notification received from the mobile device.

One or more of the above example access control systems, wherein the second recognition information further includes one or more of an acknowledgment or denial of the notification, a special response including a password, or a finger print confirmation.

One or more of the above example access control systems, wherein the second recognition system includes a card reader system, and wherein the processor is further configured to: transmit a second signal to determine a presence of an access card at or near an entrance to the restricted area, wherein the second recognition information includes a response to the second signal, and wherein the access card is associated with an authorized personal estimated to correspond to the identity of the individual.

One or more of the above example access control systems, wherein the processor is further configured to: update the stored recognition data to include image data or audio data of the first recognition information in response to the second recognition information matching the stored recognition data.

An example computer-readable medium storing instructions executable by a processor, the instructions comprising code to: determine a confidence level associated with first recognition information from a first recognition system is below a threshold, wherein the first recognition information corresponds to information on an identity of an individual attempting to access the restricted area; receive second recognition information from a second recognition system, different from the first recognition system, in response to determining the confidence level; compare the second recognition information to stored recognition data; transmit a signal to an access gate to provide access for the individual to the restricted area in response to the second recognition information matching the stored recognition data; and deny the access for the individual to the restricted area in response to the second recognition information not matching the stored recognition data.

The above example computer-readable medium, wherein the first recognition system includes one or more of a facial recognition system, a gait recognition system, or an audio recognition system.

One or more of the above example computer-readable mediums, wherein the second recognition system includes a mobile device verification system, and the instructions further comprise code to: determine a location of a mobile device associated with an authorized personal estimated to correspond to the identity of the individual, wherein the second recognition information includes the location of the mobile device and the stored recognition data includes a location of the restricted area.

One or more of the above example computer-readable mediums, wherein the second recognition system includes a mobile device verification system, and the instructions further comprise code to: transmit a notification to a mobile device associated with an authorized personal estimated to correspond to the identity of the individual, wherein the second recognition information includes a response to the notification received from the mobile device.

One or more of the above example computer-readable mediums, wherein the second recognition information further includes one or more of an acknowledgment or denial of the notification, a special response including a password, or a finger print confirmation.

One or more of the above example computer-readable mediums, wherein the second recognition system includes a card reader system, and the instructions further comprise code to: transmit a second signal to determine a presence of an access card at or near an entrance to the restricted area, wherein the second recognition information includes a response to the second signal, and wherein the access card is associated with an authorized personal estimated to correspond to the identity of the individual.

One or more of the above example computer-readable mediums, wherein the instructions further comprise code to: update the stored recognition data to include image data or audio data of the first recognition information in response to the second recognition information matching the stored recognition data.

The aspects of the disclosure discussed herein may also be described and implemented in the context of computer-readable storage medium storing computer-executable instructions. Computer-readable storage media includes computer storage media and communication media. For example, flash memory drives, digital versatile discs (DVDs), compact discs (CDs), floppy disks, and tape cassettes. Computer-readable storage media may include volatile and nonvolatile, removable and non-removable media implemented in any method or technology for storage of information such as computer readable instructions, data structures, modules or other data.

It will be appreciated that various implementations of the above-disclosed and other features and functions, or alternatives or varieties thereof, may be desirably combined into many other different systems or applications. Also that various presently unforeseen or unanticipated alternatives, modifications, variations, or improvements therein may be subsequently made by those skilled in the art which are also intended to be encompassed by the following claims.

What is claimed is:

1. A method for access control to a restricted area, comprising:
   determining a confidence level associated with first recognition information from a first recognition system is below a threshold, wherein the first recognition system is comprised in a node installed at an access point of the restricted area, wherein the first recognition information corresponds to information on an identity of an individual attempting to access the restricted area;
   receiving second recognition information from a second recognition system that is comprised in a different node and includes a mobile device verification system configured to wirelessly communicate with a mobile device of the individual in response to determining the confidence level;
   comparing the second recognition information to stored recognition data;
   transmitting a signal to an access gate to provide access for the individual to the restricted area in response to the second recognition information matching the stored recognition data; and
   denying the access for the individual to the restricted area in response to the second recognition information not matching the stored recognition data.

2. The method of claim 1, wherein the first recognition system includes one or more of a gait recognition system or an audio recognition system.

3. The method of claim 1, wherein the second recognition system includes a mobile device verification system, and wherein the method further comprises:
   determining a location of a mobile device associated with an authorized personnel estimated to correspond to the identity of the individual, wherein the second recognition information includes the location of the mobile device and the stored recognition data includes a location of the restricted area.

4. The method of claim 1, wherein the second recognition system includes a mobile device verification system, and wherein the method further comprises:

transmitting a notification to a mobile device associated with an authorized personnel estimated to correspond to the identity of the individual, wherein the second recognition information includes a response to the notification received from the mobile device.

5. The method of claim 4, wherein the second recognition information further includes one or more of an acknowledgment or denial of the notification, a special response including a password, or a finger print confirmation.

6. The method of claim 1, wherein the second recognition system includes a card reader system, and wherein the method further comprises:

transmitting a second signal to determine a presence of an access card at or near an entrance to the restricted area, wherein the second recognition information includes a response to the second signal, and wherein the access card is associated with an authorized personnel estimated to correspond to the identity of the individual.

7. The method of claim 1, further comprising:

updating the stored recognition data to include image data or audio data of the first recognition information in response to the second recognition information matching the stored recognition data.

8. An access control system for a restricted area, comprising:

a memory storing instructions; and a processor coupled with the memory and configured to:
determine a confidence level associated with first recognition information from a first recognition system is below a threshold, wherein the first recognition system is comprised in a node installed at an access point of the restricted area comprises a non facial recognition system, wherein the first recognition information corresponds to information on an identity of an individual attempting to access the restricted area;
receive second recognition information from a second recognition system that is comprised in a different node and includes a mobile verification system configured to wirelessly communicate with a mobile device of the individual, in response to determining the confidence level;
compare the second recognition information to stored recognition data;
transmit a signal to an access gate to provide access for the individual to the restricted area in response to the second recognition information matching the stored recognition data; and
deny the access for the individual to the restricted area in response to the second recognition information not matching the stored recognition data.

9. The access control system of claim 8, wherein the first recognition system includes one or more of a gait recognition system or an audio recognition system.

10. The access control system of claim 8, wherein the second recognition system includes a mobile device verification system, and wherein the processor is further configured to:

determine a location of a mobile device associated with an authorized personnel estimated to correspond to the identity of the individual, wherein the second recognition information includes the location of the mobile device and the stored recognition data includes a location of the restricted area.

11. The access control system of claim 8, wherein the second recognition system includes a mobile device verification system, and wherein the processor is further configured to:

transmit a notification to a mobile device associated with an authorized personnel estimated to correspond to the identity of the individual, wherein the second recognition information includes a response to the notification received from the mobile device.

12. The access control system of claim 11, wherein the second recognition information further includes one or more of an acknowledgment or denial of the notification, a special response including a password, or a finger print confirmation.

13. The access control system of claim 8, wherein the second recognition system includes a card reader system, and wherein the processor is further configured to:

transmit a second signal to determine a presence of an access card at or near an entrance to the restricted area, wherein the second recognition information includes a response to the second signal, and wherein the access card is associated with an authorized personal estimated to correspond to the identity of the individual.

14. The access control system of claim 8, wherein the processor is further configured to:

update the stored recognition data to include image data or audio data of the first recognition information in response to the second recognition information matching the stored recognition data.

15. A non-transitory computer-readable medium storing instructions executable by a processor for controlling access to a restricted area, the instructions comprising code to:

determine a confidence level associated with first recognition information from a first recognition system is below a threshold, wherein the first recognition system is comprised in a node installed at an access point of the restricted area, wherein the first recognition information corresponds to information on an identity of an individual attempting to access a restricted area;
receive second recognition information from a second recognition system that is comprised in a different node and includes a mobile verification system configured to wirelessly communicate with a mobile device of the individual, in response to determining the confidence level;
compare the second recognition information to stored recognition data;
transmit a signal to an access gate to provide access for the individual to the restricted area in response to the second recognition information matching the stored recognition data; and
deny the access for the individual to the restricted area in response to the second recognition information not matching the stored recognition data.

16. The non-transitory computer-readable medium of claim 15, wherein the first recognition system includes one or more of a gait recognition system or an audio recognition system.

17. The non-transitory computer-readable medium of claim 15, wherein the second recognition system includes a mobile device verification system, and the instructions further comprise code to:

determine a location of a mobile device associated with an authorized personnel estimated to correspond to the identity of the individual, wherein the second recognition information includes the location of the mobile device and the stored recognition data includes a location of the restricted area.

18. The non-transitory computer-readable medium of claim 15, wherein the second recognition system includes a mobile device verification system, and the instructions further comprise code to:

transmit a notification to a mobile device associated with an authorized personnel estimated to correspond to the identity of the individual, wherein the second recognition information includes a response to the notification received from the mobile device.

19. The non-transitory computer-readable medium of claim 18, wherein the second recognition information further includes one or more of an acknowledgment or denial of the notification, a special response including a password, or a finger print confirmation.

20. The non-transitory computer-readable medium of claim 15, wherein the second recognition system includes a card reader system, and the instructions further comprise code to:

transmit a second signal to determine a presence of an access card at or near an entrance to the restricted area, wherein the second recognition information includes a response to the second signal, and wherein the access card is associated with an authorized personal estimated to correspond to the identity of the individual.

* * * * *